United States Patent [19]
Austin

[11] 4,282,995
[45] Aug. 11, 1981

[54] SPARE TIRE BRACKET LOCK FOR PICK-UP TRUCKS AND LIKE VEHICLES
[75] Inventor: George O. Austin, Phoenix, Ariz.
[73] Assignee: Wilma D. Austin, Phoenix, Ariz.
[21] Appl. No.: 134,586
[22] Filed: Mar. 27, 1980
[51] Int. Cl.³ .................... B62D 43/04; E05B 65/12
[52] U.S. Cl. .................... 224/42.23; 70/54; 70/230; 70/259; 224/42.25
[58] Field of Search .................... 224/42.23, 42.25; 70/56, 229, 230, 232, 259, DIG. 56, 54, 55

[56] References Cited
U.S. PATENT DOCUMENTS

| 1,500,849 | 7/1924 | Rudolph | 70/230 X |
| 1,592,785 | 7/1926 | Soley | 70/230 X |
| 1,609,440 | 12/1926 | Szydlowski | 70/230 X |
| 1,761,920 | 6/1930 | Hunz et al. | 224/42.23 |
| 1,797,222 | 3/1931 | Alborn et al. | 224/42.23 X |
| 1,991,208 | 2/1935 | Hawkins | 70/259 |
| 3,884,057 | 5/1975 | Maurer | 70/259 |
| 4,225,066 | 9/1980 | Barr | 70/259 X |

Primary Examiner—Stephen Marcus
Attorney, Agent, or Firm—James F. Duffy

[57] ABSTRACT

A spare tire bracket lock is provided to prevent the theft of a spare tire from a pick-up truck or a similar vehicle of the type wherein the spare tire is stored beneath the undercarriage of the vehicle. The spare tire is supported by an elongated mounting bracket, which bracket is in turn supported by a pair of bolts secured to the undercarriage of the vehicle. A nut engages the lower portion of one of the bolts for removably securing the bracket thereto. The nut includes a flange having an eye for receiving the shackle of a padlock. The spare tire bracket lock includes a lipped portion which is slid over one edge of the bracket, the flange of the nut being simultaneously slid through a slot in the spare tire bracket lock. Positioned adjacent opposite faces of the flange are locking members having holes aligned with the eye of the flange for allowing the shackle of a padlock to be simultaneously passed through the holes in the locking members and the eye of the flange. The spare tire bracket lock also includes a shield plate for restricting access to the shackle of the padlock.

8 Claims, 6 Drawing Figures

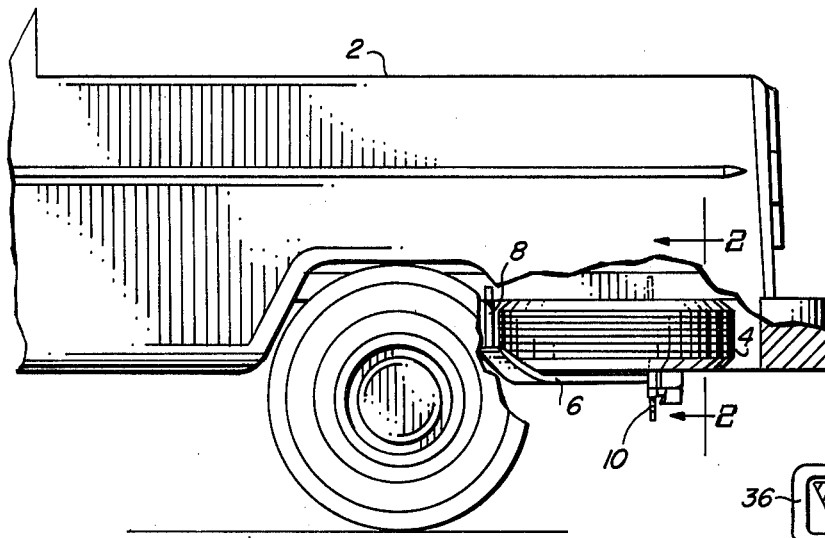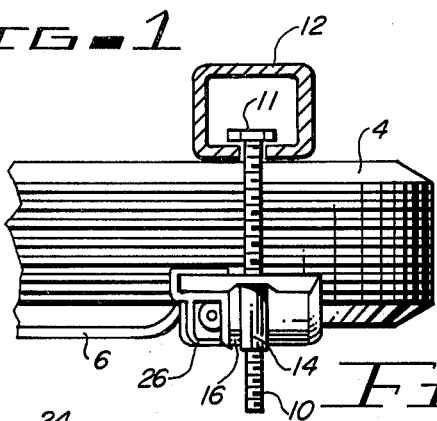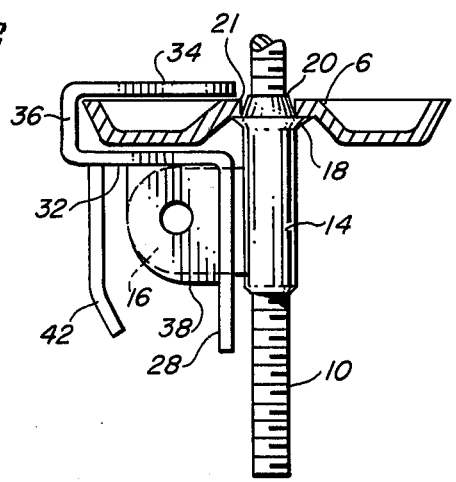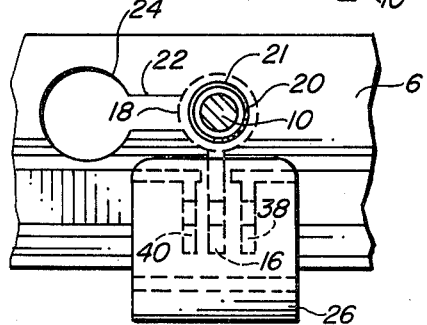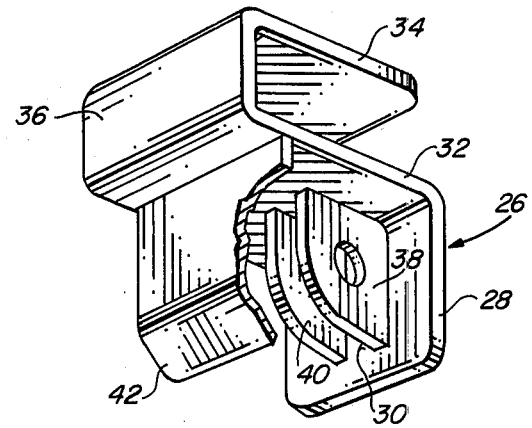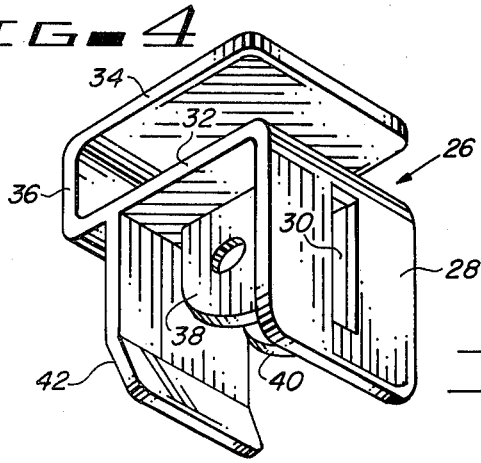

2
SPARE TIRE BRACKET LOCK FOR PICK-UP TRUCKS AND LIKE VEHICLES

BACKGROUND OF THE INVENTION

1. Field of the Invention

The present invention relates generally to devices for locking spare tires to vehicles and, more particularly, to a spare tire bracket lock for use in conjunction with pick-up trucks and similar vehicles having a mounting bracket for storing a spare tire below the undercarriage of the vehicle.

2. Description of the Prior Art

Pick-up trucks and similar vehicles are often equipped with a spare tire mounting bracket for storing a spare tire against the undercarriage of the vehicle, typically near the rear portion of the vehicle. The spare tire is supported by an elongated bracket or tire rack which clamps the tire against the underside of the vehicle. One end of the bracket is suspended by the enlarged head of a bolt, the bolt extending upwardly through a slotted hole in the bracket and being secured at its upper end to the frame of the vehicle. The slotted hole at the first end of the bracket allows the bracket to be rotated and tilted relative to the bolt to allow the spare tire to be accessed. At a second end of the bracket opposite the first end are a large and a small circular hole which are connected by a narrow passage. A second bolt is secured at its upper end to the frame of the vehicle and extends downwardly in the vicinity of the large and small circular holes. The second bolt is loosely secured to the frame of the vehicle in order to permit lateral movement at the lower end of the bolt. The lower end of this second bolt is threaded, and a nut is provided for engaging the threads of the second bolt and supporting the second end of the bracket. Typically, the nut is constructed to include a flange extending laterally from the lower portion of the nut, the flange allowing the owner of the vehicle to more easily rotate the nut by hand. The upper portion of the nut includes a circular collar which fits within the small hole in the second end of the bracket. The narrow passage in the second end of the bracket is slightly wider than the diameter of the bolt but is smaller than the diameter of the circular collar. Therefore, when the spare tire is to be removed, the nut must be loosened sufficiently to permit the second end of the bracket to be raised above the circular collar of the nut. The bolt can then be slid through the narrow passage and into the larger circular hole through which the nut can be passed for allowing the second end of the bracket to be lowered to the ground to provide access to the spare tire.

Thefts of spare tires from pick-up trucks and similar vehicles utilizing the above described spare tire storage assembly are very common since the nut incorporating the flange can be untightened, the bracket lowered, and the spare tire removed, all within a relatively short interval of time. To deter such thefts, manufacturers of such vehicles typically provide an eye within the flange of the nut of sufficient size to permit the passage of a shackle of a padlock. The shackle of the padlock is also passed through the end links of a chain which is passed through the frame of the vehicle, the chain and the padlock thereby preventing rotation of the nut securing the bracket to the second bolt.

However, such measures have not proven very effective in detering thefts of spare tires. Spare tire thieves often possess cutting tools such as bolt cutters which can be quickly applied on those portions of the chain which are accessible to the thief. Even when a heavy-duty hardened chain is used, thieves can apply the cutting tools directly to the shackle of the padlock rather than to the links of the chain in order to remove the spare tire. Additionally, such chains are noisy and are not conveniently installed or removed when the vehicle owner must access the spare tire.

It is therefore an object of the present invention to provide, for use in conjunction with vehicles of the type wherein a spare tire is stored upon a bracket secured to the undercarriage of the vehicle, a locking device which deters thefts of spare tires from such vehicles.

Another object of the present invention is to provide, for use in conjunction with a vehicle having a spare tire mounting bracket secured to a supporting bolt by a nut, a locking device which prevents a thief from rotating the nut and removing the spare tire.

Still another object of the present invention is to provide, for use in conjunction with vehicles having a spare tire mounting bracket secured to a supporting bolt by a nut having a flange with an eye therein for receiving the shackle of a padlock, a locking device which significantly restricts access by a thief to the shackle of the padlock.

A further object of the present invention is to provide, for use in conjunction with a vehicle having a spare tire mounting bracket secured to a supporting bolt by a nut, a locking device which prevents a thief from rotating the nut and removing the spare tire while permitting the owner of the vehicle to quickly and easily access the spare tire.

SUMMARY OF THE INVENTION

Briefly described, and in accordance with one embodiment thereof, the present invention relates to a spare tire bracket lock which slidingly engages a spare tire mounting bracket and simultaneously engages the flange of the nut used to secure the spare tire mounting bracket to a supporting bolt. The spare tire bracket lock includes a first planar portion having a slot through which the flange of the nut is passed. The spare tire bracket lock also includes a second planar portion having a common edge with the first planar portion and extending perpendicularly therefrom. The spare tire bracket lock also includes a third planar portion extending above and parallel to the second planar portion and attached thereto. The second and third planar portions of the spare tire bracket lock together form a lipped portion which engages the spare tire mounting bracket, the second planar portion being slid below the mounting bracket and the third planar portion being slid above the mounting bracket, wherein the engagement of the spare tire bracket lock with the spare tire mounting bracket prevents rotation of the flange. Fourth and fifth planar portions of the spare tire bracket lock extend adjacent opposite edges of the slot surrounding the two faces of the inserted flange for further immobilizing the flange. The fourth and fifth planar portions each include a hole aligned with the eye of the flange for allowing the shackle of a padlock to be passed simultaneously through the eye of the flange and through the holes within the fourth and fifth planar portions. A shield plate extending perpendicularly to the fourth and fifth planar portions may also be provided to further restrict access to the shackle of the padlock without interfering with the insertion or removal of the padlock.

BRIEF DESCRIPTION OF THE DRAWINGS

FIG. 1 is a side elevational view of the rear portion of a pick-up truck partially cutaway to reveal a spare tire sotred against the undercarriage of the truck.

FIG. 2 is a partial rear view of the spare tire and the mounting components therefor taken along lines 2—2 as shown in FIG. 1.

FIG. 3 is a cross-sectional view taken through the spare tire mounting bracket at the point at which the bracket is supported by a bolt and a nut and at which point a spare tire bracket lock has been positioned.

FIG. 4 is a partial top view of the components illustrated by FIG. 3.

FIGS. 5 and 6 are perspective views of the spare tire bracket lock from first and second angles.

DESCRIPTION OF THE PREFERRED EMBODIMENT

In FIG. 1, the rear portion of a pick-up truck 2 is shown having a spare tire 4 stored against the undercarriage of the truck. Spare tire 4 is supported by an elongated mounting bracket or tire rack 6 which is typically contoured to the shape of the spare tire. A first end of mounting bracket 6 includes a slotted hole through which a first bolt 8 is passed. The threaded end of bolt 8 is secured to the undercarriage of the vehicle while the opposite end of bolt 8 includes a head which is larger than the slotted hole for supporting the first end of mounting bracket 6. The slotted hole in the first end of mounting bracket 6 permits mounting bracket 6 to be tilted relative to bolt 8 for allowing the opposite end of mounting bracket 6 to be lowered to the ground when the spare tire must be accessed. The end of mounting bracket 6 opposite bolt 8 also includes a hole through which a second bolt 10 is passed for supporting mounting bracket 6 as is described below.

In FIGS. 2, 3 and 4, the end of mounting bracket 6 which engages second bolt 10 is illustrated in greater detail. The upper portion of bolt 10 includes an enlarged head 11 positioned within a frame member 12. The shaft of bolt 10 extends downwardly through an oversized hole in frame member 12 for allowing lateral movement of the lower end of bolt 10. An internally threaded nut 14 engages corresponding threads on the lower portion of bolt 10 and includes a flange 16 for rotating nut 14. Flange 16 includes a centrally located eye of sufficient diameter to permit the shackle of a padlock to be passed therethrough. The upper portion of nut 14 also includes a circular shoulder 18 and a circular collar 20, the diameter of collar 20 being slightly larger than the diameter of bolt 10.

As shown best in FIGS. 3 and 4, the portion of mounting bracket 6 through which bolt 10 extends includes a small circular hole 21, a larger circular hole 24 and a narrow passage or slot 22 connecting hole 21 to hole 24. The width of slot 22 is slightly larger than the diameter of bolt 10 but smaller than the diameter of collar 20. Thus, when collar 20 of nut 14 extends through the smaller hole 21 within mounting bracket 6, bolt 10 is prevented from sliding toward larger hole 24. When collar 20 is fitted within smaller hole 21, shoulder 18 urges mounting bracket 6 upwardly as nut 14 is tightened. However, if nut 14 is loosened sufficiently, mounting bracket 6 may be lifted off of shoulder 18 to allow collar 20 to pass beneath mounting bracket 6. In this instance, bolt 10 can be slid through slot 22 toward larger hole 24. If flange 16 is then aligned with slot 22, mounting bracket 6 may then be lowered completely to the ground without requiring complete removal of nut 14 from bolt 10. With one end of mounting bracket 6 lowered to the ground, the spare tire may be easily accessed. To again store a spare tire beneath pick-up truck 2, the above described procedure is reversed and nut 14 is sufficiently tightened to hold the spare tire firmly in place against the undercarriage of the vehicle.

As mentioned above, spare tires stored in this fashion are often stolen. Accordingly, the present invention provides a spare tire bracket lock for preventing rotation of nut 14 by positively locking flange 16 against mounting bracket 6. As shown in FIGS. 5 and 6, the spare tire bracket lock, designated generally at 26, includes a first planar member 28 having a slot 30 through which flange 16 of nut 14 may be passed. A second planar member 32 is arranged perpendicularly to first planar member 28, the first and second planar members being attached along a common edge. A third planar member 34 is positioned above and parallel to second planar member 32. Planar members 32 and 34 are attached to each other by member 36, the attachment to planar member 32 being made at an edge opposite the edge at which planar member 28 is attached to planar member 32. Planar members 32 and 34 are spaced sufficiently apart from each other to permit bracket lock 26 to be slid over one edge of mounting bracket 6 as illustrated in FIG. 3. Thus, planar members 32 and 34 together with member 36 form a lipped portion of the bracket lock for engaging mounting bracket 6. Slot 30 within planar member 28 is positioned for allowing flange 16 to be passed through planar member 28 as the lipped portion of bracket lock 26 is slid over mounting bracket 6. Also as shown in FIG. 3, flange 16 extends sufficiently past planar member 28 to allow free access to the eye within flange 16 as for passing the shackle of a padlock therethrough.

To further immobilize flange 16 when inserted within bracket lock 26, planar members 38 and 40 are attached to planar members 28 and 32 adjacent opposite edges of slot 30, planar members 38 and 40 lying parallel with the faces of flange 16. Planar members 38 and 40 each include a hole aligned with the eye within inserted flange 16 as shown in FIGS. 3 and 4. Thus, the shackle of a padlock may be simultaneously extended through the eye of flange 16 and the holes within planar members 38 and 40 for positively locking flange 16 to bracket lock 26.

When bracket lock 26 is positioned as shown in FIG. 3 and a padlock is applied as described above, attempts to rotate nut 14 will cause the edges of member 36 to engage the edges of mounting bracket 6 thereby preventing further rotation of nut 14 and preventing removal of the spare tire. To provide added security, bracket lock 26 may also include a shield plate 42 extending perpendicularly to and in close proximity with planar members 38 and 40 for restricting access to the shackle of an inserted padlock. Heavy duty bolt cutters and similar cutting tools typically have large cutting jaws for engaging the article to be cut. Shield plate 42, in combination with planar member 28, significantly restricts the application of such large cutting tools to the shackle of the inserted padlock. Shield plate 42 is spaced sufficiently apart from planar member 28 to allow convenient application of a padlock to bracket lock 26.

In the preferred embodiment of the invention, bracket lock 26 is fabricated from mild steel, a single piece of such mild steel being shaped to form planar members 28, 32, 34 and member 36. After appropriate holes are drilled in planar members 38 and 40, these members are positioned adjacent slot 30 and welded to both planar members 28 and 32. Similarly, shield plate 42 is welded to planar member 32 opposite planar member 28.

From the above description of the invention, it should be appreciated that a bracket lock has been provided for preventing unauthorized removal of a spare tire from the undercarriage of a pick-up truck or similar vehicle. The described bracket lock is easily and quickly applied to conventional spare tire mounting hardware and is adapted to be used in conjunction with a standard padlock without requiring chains or other noisy and inconvenient security devices. The described bracket lock is relatively tamper-proof and significantly impedes the application of cutting tools to the shackle of an inserted padlock.

While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A spare tire bracket lock for deterring theft of a spare tire from a pick-up truck or similar vehicle, the vehicle including an elongated bracket for retaining the spare tire against the undercarriage of the vehicle, the vehicle also including a threaded bolt attached to the undercarriage of the vehicle for extension through a hole in one end of said elongated bracket, said threaded bolt being engaged by a nut for securing said elongated bracket to said threaded bolt, said nut including a flange having an eye therein, said spare tire bracket lock comprising in combination:
   a. a lipped member for sliding over one edge of said elongated bracket, said lipped member engaging an upper surface, a lower surface, and one edge of said elongated bracket; and
   b. a slotted member having a slot for slidingly receiving the flange of said nut as said lipped member is slid over the one edge of said elongated bracket, said slotted member being attached to said lipped member for preventing rotation of the flange of said nut, said slotted member permitting a shackle of a padlock to be passed through the eye within the flange of said nut for preventing unauthorized removal of the spare tire.

2. The spare tire bracket lock as recited in claim 1 further including a first member located adjacent the slot of said slotted member, said first member lying parallel to a face of the flange of said nut, said first member having a hole therein, the hole being aligned with the eye within the flange of said nut wherein the shackle of a padlock may be passed simultaneously through the eye within the flange of said nut and through the hole within said first member.

3. The spare tire bracket lock as recited in claim 2 further including a second member located adjacent the slot of said slotted member opposite and parallel to said first member, said second member having a hole therein, the hole in said second member being aligned with the hole in said first member wherein the shackle of a padlock may be passed simultaneously through the eye within the flange of said nut and through the holes within said first and second members.

4. The spare tire bracket lock as recited in claim 1 further including a shield plate positioned adjacent an edge of the flange of said nut, said shield plate allowing the shackle of a padlock to be passed through the eye within the flange of said nut while restricting access to the shackle after the padlock has been thus inserted.

5. A spare tire bracket lock for deterring theft of a spare tire from a pick-up truck or similar vehicle, the vehicle including an elongated bracket for retaining the spare tire against the undercarriage of the vehicle, the vehicle also including a threaded bolt attached to the undercarriage of the vehicle for extension through a hole in one end of said elongated bracket, said threaded bolt being engaged by a nut for securing said elongated bracket to said threaded bolt, said nut including a flange having an eye therein, said spare tire bracket lock comprising in combination:
   a. a first planar member having a slot through which the flange of said nut is passed, said first planar member permitting a shackle of a padlock to be passed through the eye within the flange of said nut;
   b. a second planar member lying perpendicular to said first planar member, said second planar member and said first planar member being attached to each other along a common edge;
   c. a third planar member lying parallel to said second planar member, said third planar member lying on a side of a plane containing said second planar member opposite the side on which said first planar member lies; and
   e. attaching means for attaching said third planar member to said second planar member at an edge of said second planar member opposite said common edge, wherein said second and third planar members and said attaching means form a lipped portion for sliding over one edge of said elongated bracket and for preventing rotation of the flange of said nut.

6. The spare tire bracket lock as recited in claim 5 further including a fourth planar member extending perpendicular to said first and second planar members adjacent a first face of the flange of said nut, said fourth planar member having a hole therein aligned with the eye within the flange of said nut wherein the shackle of a padlock may be passed simultaneously through the eye within the flange of said nut and through the hole within said fourth planar member.

7. The spare tire bracket lock as recited in claim 6 including a fifth planar member extending parallel to said fourth planar member and adjacent to a second face of the flange of said nut opposite the first face, said fifth planar member having a hole therein aligned with the hole in said fourth planar member wherein the shackle of a padlock may be passed simultaneously through the eye within the flange of said nut and through the holes within said fourth and fifth planar members.

8. The spare tire bracket lock as recited in claim 5 further including a shield plate positioned adjacent an edge of the flange of said nut, said shield plate allowing the shackle of a padlock to be passed through the eye within the flange of said nut while restricting access to the shackle after the padlock has been thus inserted.

* * * * *